United States Patent
Kanter et al.

(10) Patent No.: US 11,499,925 B2
(45) Date of Patent: Nov. 15, 2022

(54) X-RAY IMAGING APPARATUS AND X-RAY IMAGING METHOD

(71) Applicant: Siemens Healthcare GmbH, Erlangen (DE)

(72) Inventors: Marcel Kanter, Erlangen (DE); Malte Tschentscher, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 26 days.

(21) Appl. No.: 17/032,197

(22) Filed: Sep. 25, 2020

(65) Prior Publication Data

US 2021/0102905 A1   Apr. 8, 2021

(30) Foreign Application Priority Data

Oct. 7, 2019 (EP) .................................. 19201712

(51) Int. Cl.
*G01N 23/04* (2018.01)

(52) U.S. Cl.
CPC .................................. *G01N 23/04* (2013.01)

(58) Field of Classification Search
CPC ...... G01N 23/04; G01T 1/295; A61B 6/4208; A61B 6/5229
See application file for complete search history.

(56) References Cited

U.S. PATENT DOCUMENTS

| 7,888,626 | B2 * | 2/2011 | Slinger | G06T 1/0007 |
| | | | | 250/226 |
| 7,915,590 | B2 * | 3/2011 | Starfield | G01T 1/295 |
| | | | | 250/363.02 |

(Continued)

FOREIGN PATENT DOCUMENTS

| EP | 2224850 B1 | 6/2012 |
| EP | 1883839 B1 | 7/2012 |

(Continued)

OTHER PUBLICATIONS

Zhang, Ai-Xin et al. "Tabletop x-ray ghost imaging with ultra-low radiation" Optica, vol. 5, No. 4, pp. 374-377, Apr. 2018 // https://doi.org/10.1364/OPTICA.5.000374.

(Continued)

*Primary Examiner* — David P Porta
*Assistant Examiner* — Djura Malevic
(74) *Attorney, Agent, or Firm* — Harness, Dickey & Pierce, P.L.C.

(57) ABSTRACT

In an embodiment, an X-ray imaging apparatus includes an X-ray radiation source to emit X-ray radiation, an object to be sampled being within a receiving region; a converter for spatially resolved conversion of X-ray radiation, after passing through the receiving region, into visible light; a detector, to emit a detector signal based upon visible light from the converter registered by the detector; a pattern generator, to realize a large number of light and shadow patterns (LSPs) in a time-staggered manner by acting on visible light generated by the converter, respective detector signals being generated based upon respective LSPs; and at least one processor, to generate the image of the object based upon the detector signals generated and an item of information about the LSPs. The pattern generator device is configured to generate the large number of LSPs by at least one of overriding and partial shadowing of the visible light.

18 Claims, 1 Drawing Sheet

(56) References Cited

U.S. PATENT DOCUMENTS

| | | | | |
|---|---|---|---|---|
| 8,237,124 B2* | 8/2012 | Marwala | ................ | A61B 6/583 |
| | | | | 250/363.06 |
| 8,558,182 B2* | 10/2013 | Chi | ................ | G02F 1/35 |
| | | | | 250/363.06 |
| 9,040,930 B2* | 5/2015 | Kyele | ................ | G01T 1/2914 |
| | | | | 250/370.1 |
| 9,110,172 B2* | 8/2015 | Lalleman | ................ | G01T 1/295 |
| 9,344,700 B2* | 5/2016 | Zalevsky | ................ | G02B 27/46 |
| 10,033,996 B2* | 7/2018 | Zalevsky | ................ | G06T 5/001 |
| 10,987,071 B2* | 4/2021 | Cuadros | ................ | A61B 6/04 |
| 2002/0075990 A1* | 6/2002 | Lanza | ................ | G01T 1/295 |
| | | | | 378/2 |
| 2009/0095912 A1* | 4/2009 | Slinger | ................ | G06T 1/0007 |
| | | | | 250/363.06 |
| 2009/0202043 A1* | 8/2009 | Cantu | ................ | A61B 6/4283 |
| | | | | 378/98.9 |
| 2011/0190616 A1* | 8/2011 | Marwala | ................ | A61B 6/583 |
| | | | | 600/407 |
| 2013/0094627 A1* | 4/2013 | Lalleman | ................ | G01T 1/295 |
| | | | | 378/87 |
| 2015/0381958 A1* | 12/2015 | Zalevsky | ................ | G02B 27/46 |
| | | | | 250/354.1 |
| 2017/0163961 A1* | 6/2017 | Zalevsky | ................ | G02B 30/24 |

FOREIGN PATENT DOCUMENTS

| | | |
|---|---|---|
| EP | 2581733 A1 | 4/2013 |
| WO | WO-2015118540 A1 | 8/2015 |

OTHER PUBLICATIONS

Morris, Peter A. et al. "Imaging with a small number of photons" nature Communications, vol. 6, No. 5913, 2015 // doi: 10.1038/ncomms6913.

Sun, Ming-Jie et al. "Improving the performance of computational ghost imaging by using a quadrant detector and digital micro-scanning" Scientific Reports, vol. 9, No. 4105, Mar. 2019 // https://doi.org/10.1038/s41598-019-40798-x.

* cited by examiner

X-RAY IMAGING APPARATUS AND X-RAY IMAGING METHOD

PRIORITY STATEMENT

The present application hereby claims priority under 35 U.S.C. § 119 to European patent application number EP 19201712.7 filed Oct. 7, 2019, the entire contents of which are hereby incorporated herein by reference.

FIELD

Various examples of embodiments of the present invention generally relate to an X-ray imaging apparatus and an X-ray imaging method, in particular for carrying out ghost imaging.

BACKGROUND

In conventional (projection) X-ray technology, the image quality is proportional to the photon flux density used, which in turn is associated with a corresponding radiation exposure (radiation dose) of the object. An important challenge of medical X-ray imaging is therefore to reduce the radiation dose to the furthest possible extent while maintaining an acceptable image quality. For high-resolution recordings, a challenge is also posed in X-ray imaging today by image artifacts, which set demanding requirements with regard to the homogeneity of the beam path.

One possibility for reducing the radiation dose applied to an object during imaging is provided by what is known as "ghost imaging", sometimes also "coincidence imaging".

Ghost imaging or two-photon imaging or correlated photon imaging refers to an imaging method based on the correlation of two electromagnetic beam paths. An object for which imaging is to be performed (i.e. which is to be scanned) is usually located in a first of the two beam paths. A single-pixel detector ("bucket detector") is arranged behind the object in the first beam path and can detect the light beams which strike it. A high-resolution detector, for example a camera with a grid of detector pixels, but no object, is located in a second beam path. The single-pixel detector and the high-resolution detector usually have the same effective detector surface.

Electromagnetic beams (or, for short: light beams, wherein these do not have to lie in the visible frequency spectrum), are then guided such that, if no object were present, they would strike both the single-pixel detector and the high-resolution detector in the same positions simultaneously, in other words in both cases in the upper left corner simultaneously, etc. The light beams are used to travel along (scan) the effective detector surface, in other words the light beams are guided such that they gradually strike this entire effective detector surface.

An analysis device registers when one of the detector pixels of the high-resolution detector detects a light incidence at the same time as the single-pixel detector also detects a light incidence.

If an object is now arranged in the first beam path, the light beams in the second beam path continue to gradually travel along the effective detector surface. In the first beam path, on the other hand, the light beams are from time to time absorbed by the object and therefore do not strike the single-pixel detector. The analysis device then recognizes that no simultaneous detection has taken place, and it is simultaneously clear from the registering pixel of the high-resolution detector at which position in the first beam path this has taken place. In this way, the high-resolution detector in the second beam path can be used to generate an accurate silhouette of the object without detecting light beams that have interacted with the object.

This technology has many forms of application and in particular increases the design freedom, since for example different types of light beams can be used in the different beam paths as long as their spatial synchronous operation, in other words the correlated spatial sampling of the effective detector surface, is given. For example, relatively weak light beams (in other words with low power or low photon flux) that can be registered by the single-pixel detector can be used in the first beam path, while relatively strong light beams can be used in the second beam path. In this way, a light-sensitive object can be protected and in the second beam path, on the other hand, a less sensitive and thus usually more cost-effective detector can be used. In this way, X-ray radiation with comparatively low photon flux density can be used in the first beam path during X-ray imaging.

A disadvantage of this method is that the high-energy X-ray radiation usually makes it difficult to generate patterns, and beam optics for separately detecting the intensity distributions for the light and shadow patterns are not usually available.

One development of ghost imaging resides in that only a single beam path is used, and that the imaging light (e.g. X-ray radiation) is instead emitted from the light source in the form of different light and shadow patterns, or is converted into such light and shadow patterns by a pattern generator before striking the object. To this end, firstly an intensity distribution $I_i$ is registered for each light and shadow pattern i via a spatially high-resolution detector. These intensity distributions $I_i$ can be stored in a memory.

For the sampling of an object, the object is then arranged in front of a low-resolution detector, for example a single-pixel detector ("bucket detector") and illuminated with the individual light and shadow patterns i, wherein the low-resolution detector in each case registers the associated intensity $S_i$.

From the spatially 2-dimensionally resolved intensity distribution Ii(x, y), it is possible to calculate the intensity Si recorded in each case for/with this light and shadow pattern by exploiting the correlation of the ghost image G(x,y) as follows:

$$G(x, y) = \langle SI(x, y) \rangle - \langle S \rangle \langle I(x, y) \rangle \approx \frac{1}{N}\sum_{i=1}^{N} S_i I_i(x, y) - \frac{1}{N^2}\sum_{i=1}^{N} S_i \sum_{i=1}^{N} I_i(x, y),$$

wherein summation is performed over the number of light and shadow patterns from i=1 . . . N, and wherein S describes the integrated detected intensity.

One application of this method, which is also referred to as "computational ghost imaging", is described for example in the scientific publication of Zhang, He, et al.: "Tabletop x-ray ghost imaging with ultra-low radiation", Optica, Vol 5, No. 4, April 2018, p. 374-377, https://doi.org/10.1364/OPTICA.5.000374.

US 2002/075990 A1 describes a method in which a mask and an anti-mask complementary thereto are used to provide X-ray radiation with a pattern before it strikes a scintillator.

EP 2 581 733 A1 describes a polychrome digital X-ray detector with a patterned mask for energy-sensitive X-ray imaging via single exposure.

SUMMARY

In the above method, too, the inventors have discovered that there are however major challenges for generating reliable beam optics for the high-energy X-ray radiation, for switching between individual light and shadow patterns, and for the reproducibility of results.

At least one embodiment of the present invention provides an improved imaging apparatus and an improved imaging method which in particular overcome the challenges set out above.

This claims describe advantageous developments, embodiments and variants.

At least one embodiment of the invention provides on the one hand an imaging apparatus.

In at least one embodiment, an imaging apparatus for creating an image of an object by irradiating the object with X-ray radiation, comprises:

an X-ray radiation source to emit X-ray radiation, an object to be sampled with the X-ray radiation being within a receiving region;

a converter for spatially resolved conversion of X-ray radiation, after passing through the receiving region, into visible light;

a detector, embodied to emit a detector signal based upon visible light from the converter registered by the detector;

a pattern generator, to realize a large number of light and shadow patterns (LSPs) in a time-staggered manner by acting on visible light generated by the converter, such that respective detector signals are generated based upon respective LSPs; and at least one processor, designed to generate the image of the object based upon the detector signals generated and an item of information about the LSPs, wherein the pattern generator device is arranged between the converter and the detector device, and is configured to generate the large number of LSPs by at least one of overriding and partial shadowing of the visible light from the converter.

At least one embodiment of the invention further provides an imaging method for creating an image of an object by irradiating the object with X-ray radiation.

At least one embodiment further provides an imaging method for creating an image of an object by irradiating the object with X-ray radiation, comprising:

emitting X-ray radiation from an X-ray radiation source into a receiving region, in which an object to be sampled is arranged, to illuminate the object to be sampled;

converting, in a spatially resolved manner, X-ray radiation having passed through the receiving region, into visible light;

generating detector signals based upon visible light registered by a detector;

generating, in a time-staggered manner, a large number of light and shadow patterns (LSPs) by acting on visible light generated by the converting, by at least one of partially shadowing the visible light from a converter performing the conversion and overriding, each respective detector signal, of the detector signals, being generated based upon a respective LSP; and generating the image of the object based upon the detector signals and an item of information about the LSPs.

At least one embodiment is directed to a non-transitory computer readable medium storing program code to, when executed by a processor, is configured to perform the method of an embodiment.

BRIEF DESCRIPTION OF THE DRAWINGS

Further advantageous developments and embodiments will be explained in the following with reference to the figures and the associated description of the figures.

The present invention is explained in more detail below with reference to the example embodiments specified in the schematic figures, in which.

Figure 1:
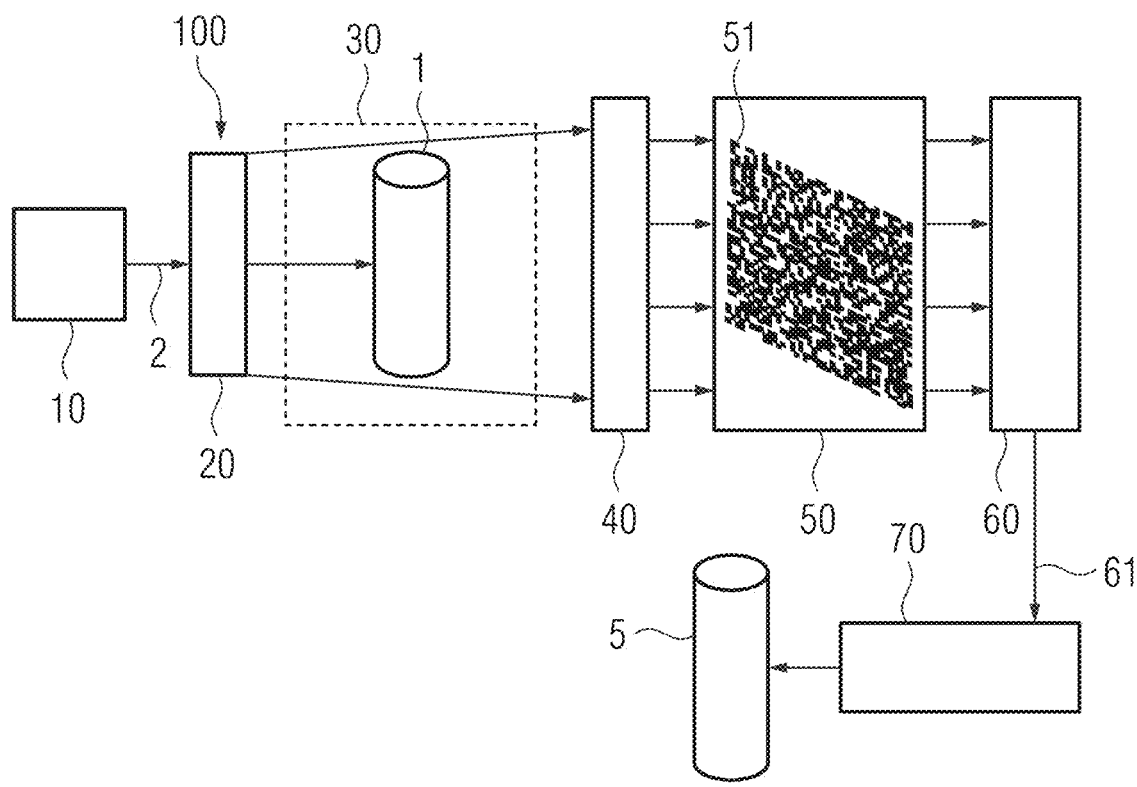
FIG. 1 shows a schematic block diagram to explain an imaging apparatus according to one embodiment of the present invention.

The accompanying figures are intended to convey a further understanding of the embodiments of the invention. They illustrate embodiments and, in conjunction with the description, serve to explain principles and concepts of the invention. The elements of the figures are not necessarily shown in correct scale to one another. Terminology specifying directions such as "top", "bottom", "left", "right", "above", "below", "horizontal", "vertical", "front", "back" and similar specifications are used solely for explanatory purposes and do not serve to limit the generality to specific embodiments as shown in the figures.

In the figures of the drawing, elements, features and components that are identical or that have an identical function or effect are in each case provided with the same reference characters unless otherwise stated.

DETAILED DESCRIPTION OF THE EXAMPLE EMBODIMENTS

The above and other elements, features, steps, and concepts of the present disclosure will be more apparent from the following detailed description in accordance with example embodiments of the invention, which will be explained with reference to the accompanying drawings.

Some examples of the present disclosure generally provide for a plurality of circuits, data storages, connections, or electrical devices such as e.g. processors. All references to these entities, or other electrical devices, or the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling. A communication between devices may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

An aspect of at least one embodiment of the present invention involves modifying computational ghost imaging methods in such a way that light and shadow patterns, LSPs, are realized not close to the source but instead close to the detector. In this way, source-independent X-ray ghost imaging is achieved.

The conversion device of at least one embodiment can in particular comprise a scintillator or consist of a scintillator. A "spatially resolved conversion of X-ray radiation" is understood in particular to mean that the X-ray radiation received from the receiving region, which X-ray radiation has thus been guided past the object in the receiving region, is converted at the conversion device such that the spatial information of the X-ray radiation (partially absorbed by the object) is not thereby lost.

Here, the pattern generator device can be realized according to a large number of variants, which are explained in further detail below. The pattern generator device interacts exclusively with visible light, in particular light generated by the conversion device, in order to circumvent the challenges associated with the handling of high-energy X-ray radiation.

The pattern generator device is designed to impress the light and shadow patterns onto visible light, thus making it possible to dispense with costly beam optics for generating patterns in/on X-ray radiation. Pattern generation by the pattern generator device can take place for example by way of overriding (making pixels white, regardless of whether they were originally black, gray or white) and/or by shadowing (making pixels black, regardless of whether they were originally black, gray or white).

The generation of each detector signal based upon a respective light and shadow pattern is achieved for example by the visible light striking the detector signal being modified by way of overriding and/or shadowing by the light and shadow pattern, LSP.

The pattern generator device is furthermore advantageously embodied in such a way that the light and shadow patterns, which are realized in a time-staggered manner (i.e. one after the other), are linearly independent. In this way, the information from each sampling procedure contributes new spatial information for the mapping of the object. The pattern generator device can furthermore be embodied to realize the light and shadow patterns, LSPs, discretely, or can be embodied to realize the light and shadow patterns, LSPs, continuously.

The predetermined information about the light and shadow patterns, LSPs, is preferably stored in a non-volatile, computer-readable data memory of the evaluation device. The predetermined information about the light and shadow patterns, LSPs, preferably comprises a predetermined item of information about each individual light and shadow pattern, LSP, which is particularly advantageous if it is known to the exact time which light and shadow pattern, LSP, has just been realized by the pattern generator device while the detector device is registering visible light.

It should be noted that in this context the velocity of light is ignored in all analyses and thus events that take place at different times from each other only on account of the velocity of light are described as simultaneous.

The predetermined information about the respective light and shadow pattern, LSP, is preferably a respective intensity distribution $I_i(x,y)$, which has been determined in a spatially resolved manner for each light and shadow pattern, LSP, via a spatially resolving detector and stored, for example as already explained above.

Alternatively, the predetermined information can also be just the spatial embodiment of the respective light and shadow pattern itself, in particular if the light and shadow patterns are known and clearly defined patterns, the light intensities of which can be calculated without measurement in the absence of an object.

As a further alternative, it can be provided that light intensities received by the detector device (for example already by the detector device itself) are integrated (or summed). In this case, it can also suffice if a predetermined item of information about the totality of the light and shadow patterns, LSPs, that have brought about the integrated/summed light intensities is known.

The detector signal can in particular comprise or describe a measured light intensity (for example in the case of a single-pixel detector as the detector device) or a plurality of measured light intensities (in the case of a low-resolution detector with few detector pixels as the detector device).

The imaging apparatus of at least one embodiment described has for example the advantage that, through the use of a pattern generator device that is independent from the X-ray light source, the requirements placed on the X-ray light source with regard to reproducibility are also reduced. It will also be possible to adapt the light and shadow patterns, LSPs, to the desired resolution of spatial frequencies, which provides the imaging with a further degree of freedom.

In some embodiments, developments or embodiment variants, the pattern generator device generates the light and shadow patterns by partially shadowing and/or overriding the visible light. In this way, a large number of known pattern generator devices are available, for example grating light valves and the like, which brings with it a high degree of design freedom.

In example imaging apparatuses, the pattern generator device and the conversion device are integrated with one another such that the conversion device converts into visible light only X-ray radiation that strikes certain regions of the conversion device in accordance with the respective LSP. In this way, the light and shadow patterns are already impressed onto the visible light when the visible light is generated. Furthermore, such an arrangement can be realized in a particularly space-saving manner.

The pattern generator device and the conversion device can also be integrated with one another in a different way. For example, an imaging plate can be provided that stores excitations by X-ray radiation and can be read out in a spatially resolved manner using visible light. A light and shadow pattern, LSP, can thus be realized by way of a targeted spatial reading out of the imaging plate.

In example imaging apparatuses, the pattern generator device and the detector device are integrated with one another such that the light and shadow pattern is generated directly on the detector device. This type of arrangement, too, can be realized in a particularly space-saving manner.

In some embodiments, developments or embodiment variants, the detector device has a resolution of greater than or equal to five and less than or equal to one hundred detector pixels, preferably of greater than or equal to five and less than or equal to fifty detector pixels, particularly preferably of greater than or equal to five and less than or equal to twenty five detector pixels. Such sensors can be realized with relatively low technical outlay and can accordingly be embodied with greater sensitivity while the overall technical outlay remains low. This in turn makes it possible to use X-ray radiation with lower sensitivity during sampling, as a result of which the object to be sampled (in other words the object to be X-rayed) is advantageously exposed to a lower radiation dose.

In some embodiments, developments or embodiment variants, several detector pixels are grouped together to form a read-out unit for evaluation purposes ("pixel binning"). The sensitivity of an existing detector can be increased further in this way. Because the spatial information is essentially coded in the light and shadow patterns, LSPs, and in the known intensity distributions Ii associated therewith, it is possible in the present invention to make trade-offs between the number of pixels of the detector device on the one hand and the sensitivity of the detector device on the other hand, without necessarily having to make compromises in terms of the spatial resolution as a result.

In some embodiments, developments or embodiment variants, the detector device is embodied as a single-detector-pixel detector ("bucket detector"). In this extreme case, the detector device has a high sensitivity while also involving low technical outlay; on the other hand, it is necessary to use a comparatively high number of light and shadow patterns, LSPs, in order to obtain sufficient information to generate the image (in other words, for the reconstruction) of the object. A higher number of light and shadow patterns, LSPs, means ceteris paribus, particularly given a constant exposure time per light and shadow pattern, LSP, a longer exposure time and thus a higher radiation exposure of the object. Depending on the desired application and the sensitivity of the object to X-ray radiation, it is thus also possible to adjust the number of detector pixels of the detector unit individually. The invention thus offers a developer a large number of design options and leverage points in order to establish the optimum configuration for each application.

In some embodiments, developments or embodiment variants, a resolution of the light and shadow patterns, LSPs, is greater than a resolution of the detector device. This, too, makes it possible to code the spatial information essentially in the light and shadow patterns, LSPs, and the associated intensity distributions, as a result of which the resolution of the detector device can be kept low in order to save costs.

In some embodiments, developments or embodiment variants, the imaging apparatus is embodied such that the total number of light and shadow patterns, LSPs, that are traversed consecutively for a single imaging process is lower than the total number of pixels of the intensity distributions I(x,y) for the light and shadow patterns, LSPs, or at least lower than the total number of pixels of the intensity distribution I(x,y) for the light and shadow patterns, LSPs, multiplied by the number of detector pixels of the detector device. In this way, compared to a conventional sampling of the object and use of a high-resolution detector, it is possible to reduce a data volume to be transmitted, since for each light and shadow pattern, LSP, in each case only one measured intensity value per detector pixel of the detector device must be transmitted to the evaluation device if the previously measured intensity distributions I(x,y) are already available to the evaluation device. Data storage and/or data transmission capacities of the detector device can thus be selected to be lower, which in turn can reduce the technical outlay and the costs of the imaging apparatus.

In some embodiments, developments or embodiment variants, a time integration or summation of the detector signals is carried out in the detector device. In this way, a data volume that must be transmitted from the detector device to the evaluation device, for example, can be reduced.

The imaging apparatus can also be embodied and configured such that a continuous illumination of the object with X-ray radiation and continuous pattern change of the light and shadow patterns, LSPs, are carried out, and the light intensities registered by the detector device are integrated. In this way, the problem of the necessary rapid detector read-outs is circumvented. Furthermore, automatically occurring system artifacts are eliminated via the correlation methods underlying the invention, in other words the exploitation of the correlation between the known light intensities of the light and shadow patterns and the measured light intensities after sampling of the object. In this way, for example, inhomogeneities caused by system impurities in the beam path are reduced or even eliminated.

At least one embodiment of the invention further provides an imaging method for creating an image of an object by irradiating the object with X-ray radiation.

The above embodiments and developments can be combined with one another as desired, wherever useful. Further possible embodiments, developments and implementations of the invention also include not explicitly mentioned combinations of features of the invention described above or in the following in relation to the example embodiments. In particular, in this context the person skilled in the art will also add individual aspects as improvements or enhancements to the respective basic form of the present invention.

The designations of method steps are intended to provide improved clarity; their numbering may but does not necessarily have to imply a temporal sequence insofar as nothing to the contrary is explicitly stated or implied. In particular, several method steps can also overlap one another partially or entirely, in other words in particular can also be carried out simultaneously.

FIG. 1 shows a schematic block diagram to explain an imaging apparatus 100 for creating an image 5 of an object 1 by irradiating the object 1 with X-ray radiation 2 according to one embodiment of the present invention.

The imaging apparatus 100 comprises an X-ray light source 10 for emitting X-ray radiation 2 and a receiving region 30 for an object 1 to be sampled with the X-ray radiation 2. The object 1 to be sampled can be for example a workpiece but also a living creature, such as for example a human patient.

The receiving region 30 can be for example a table on which the object 1 is to be placed, a closable chamber for receiving the object 1 or the like. An optical device 20, for example an aperture, can be provided between the receiving region 30 and the X-ray light source 10.

A conversion device 40 of the imaging apparatus 100 is arranged in the beam path behind the receiving region 30, which conversion device is embodied and configured to convert X-ray radiation which has passed through the receiving region 30 into visible light in a spatially resolved manner. At this point in time, it would thus still be possible to take all the spatial information about the object 1 from the converted visible light. As described above, this would however necessitate a high photon flux density, which could be detrimental to many objects 1. The conversion unit 40 can be for example a scintillator.

The imaging apparatus 100 further comprises a detector device 60, which is embodied to output a detector signal 61 based on visible light registered by the detector unit 60, wherein this visible light preferably originates from the conversion device 40. In other variants, further conversions of the generated visible light could take place in the meantime. The imaging apparatus 100 is embodied such that the X-ray radiation 2 which has passed through the receiving region 30 strikes the conversion device 40 in such a way that the visible light generated by the latter (via conversion) strikes the detector device 60 after passing through the pattern generator device 50. This advantageously takes place such that, in the case of an entirely empty light and shadow pattern, LSP, 51, which allows all radiation to pass through unchanged, the entire X-ray radiation 2 from the receiving region 30 also strikes the detector device 60.

As already explained in detail above, the imaging apparatus 100 can in particular comprise (or consist of) a single-detector-pixel detector, or have (or consist of) a detector with a comparatively low resolution, wherein considerable advantages can be realized if the resolution (i.e. number of detector pixels) of the detector device 60 is lower than a resolution (i.e. number of pixels) of the light and shadow pattern, LSP, 51. Furthermore, pixel binning can also be used to increase the sensitivity of the detector device 60 and thus reduce the time needed to illuminate (or irradiate) the object 1 with X-ray radiation 2 for each light and shadow pattern, LSP, 51.

The imaging apparatus 100 further comprises a pattern generator device 50, via which, in a time-staggered manner, a large number of light and shadow patterns, LSPs, 51 can be realized by acting on X-ray radiation 2 which has passed through the receiving region 30 and/or by acting on visible light generated by the conversion device 40, such that each detector signal 61 is generated based upon a respective light and shadow pattern, LSP, 51.

The pattern generator device 50 advantageously acts on visible light, so that it can be realized with low outlay. Pattern generation by the pattern generator device 50 can take place for example by way of overriding (making pixels white, regardless of whether they were originally black, gray or white) and/or by shadowing (making pixels black, regardless of whether they were originally black, gray or white).

The pattern generator device 50 is furthermore advantageously embodied in such a way that the light and shadow patterns, LSPs, 51, which are realized in a time-staggered manner (i.e. one after the other), are linearly independent. In this way, the information from each sampling procedure contributes new spatial information for the mapping of the object. The pattern generator device can furthermore be embodied to realize the light and shadow patterns, LSPs, 51 discretely, or can be embodied to realize the light and shadow patterns, LSPs, 51 continuously.

Finally, the imaging device 100 comprises an evaluation device 70, which is designed to generate an image 5 of the object 1 based upon the detector signals 61 and a predetermined item of information about the light and shadow patterns, LSPs, 51, preferably about a respective light and shadow pattern, LSP, 51 associated with a detector signal 61. This can take place in particular via computational ghost imaging, as described above.

In particular, for each light and shadow pattern, LSP, 51, an associated intensity distribution I(x,y), recorded with a high-resolution detector, can be predetermined and stored in a data memory of the evaluation device 70. By exploiting the correlation between these intensity distributions I(x,y), the intensity measured in each case by the detector device 60 and the information indicating which light and shadow pattern, LSP, 51 generated which intensity at the detector device 60, it is therefore possible to generate the image 5 of the object 1 according to known algorithms.

In FIG. 1, the imaging apparatus 100 has been shown by way of example such that the conversion device 40, the pattern generator device 50 and the detector device 60 are each represented as blocks which are separate from one another.

However, as explained above, it can be advantageous, depending on the application, to integrate several or even all of these function blocks with one another.

For example, the pattern generator device 50 and the conversion device 40 can be integrated with one another such that the conversion device 40 converts into visible light only X-ray radiation 2 that strikes certain regions of the conversion device 40 in accordance with the respective light and shadow pattern, LSP, 51. Furthermore, an imaging plate can be provided that stores excitations by X-ray radiation 2 and can be read out in a spatially resolved manner using visible light. A light and shadow pattern, LSP, 51 can thus be realized by way of a targeted spatial reading out of the imaging plate. As a further alternative, the pattern generator device 50 and the detector device 60 can be integrated with one another such that the respective light and shadow pattern, LSP, 51 is generated directly on the detector device 60.

The imaging apparatus 100 represented schematically in FIG. 1 can thus be varied according to a large number of variants and options described above.

Figure 2:
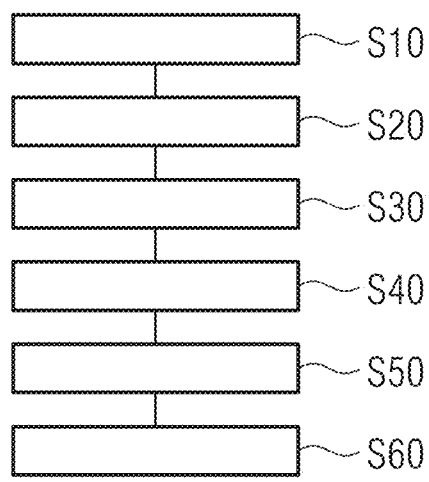
FIG. 2 shows a schematic flow diagram to explain an imaging method according to a further embodiment of the present invention.

FIG. 2 shows a schematic flow diagram to explain an imaging method for creating an image 5 of an object 1 by irradiating the object 1 with X-ray radiation 2 according to a further embodiment of the present invention. The method according to FIG. 2 can be carried out in particular via the imaging apparatus 100 according to FIG. 1. The method according to FIG. 2 can thus be adapted according to all options, variants and developments described in connection with the imaging apparatus 100 and vice versa.

In a step S10, an object 1 to be sampled is arranged in a receiving region 30.

In a step S20, X-ray radiation 2 is emitted by an X-ray light source 10 to irradiate the receiving region 30 and thus also the object 1. Optionally, the X-ray radiation can be shaped, e.g. focused, by an optical device 20 before entering the receiving region 30.

In a step S30, X-ray radiation 2 which has passed through the receiving region 30 (in other words, has not been absorbed by the object 1 or has been scattered entirely out of the beam path) is converted in a spatially resolved manner into visible light, for example by a conversion device 40, as explained in detail above.

In a step S40, a large number of light and shadow patterns, LSPs, 51 are realized in a time-staggered manner by acting on X-ray radiation 2 which has passed through the receiving region 30 and/or on visible light generated via conversion, such that a detector signal 61 generated in a step S50 by a detector device 60 is generated based upon visible light occurring after conversion at the detector device 60 and based upon a respective light and shadow pattern, LSP, 51. As described, an individual detector signal 61 can be generated for each light and shadow pattern, LSP, 51; alternatively, detector signals 61 can also be based on several light and shadow patterns, LSPs, 51 after integration/summation.

For example, the generation S40 of the light and shadow patterns, LSPs, 51 can comprise a partial shadowing and/or overriding of light from the conversion device 40. Alternatively or in addition, the generation S50 of the light and shadow patterns, LSPs, 51 can also comprise the spatially resolved, targeted suppression of the conversion of X-ray radiation 2 by the conversion device 40. Further alternatively or in addition, the generation S50 of the light and shadow patterns, LSPs, 51 can also comprise the spatially resolved, targeted suppression of the detection of visible light by the detector device 60. In each of these cases, "spatially resolved" refers respectively to the pattern sequence, for example of white and black pixels, predetermined by the respective light and shadow pattern, LSP, 51. Each of these variants has in common the fact that the detector signal 61 generated by the detector device 60 ultimately depends not only on the sampled object 1 but also on the light and shadow pattern, LSP, 51 used/generated in each case.

In a step S60, an image 5 of the object 1 is generated based upon the detector signals 61 and a predetermined item of information about the light and shadow patterns, LSPs, 51. As already explained in detail above, this can take place via known computational ghost imaging methods, in particular using predetermined intensity distributions I(x,y) for each of the light and shadow patterns, LSPs, 51.

In the preceding detailed description, different features for improving the stringency of the representation have been summarized. It should however be clear that the above description is of a merely illustrative, but in no way restrictive nature. It serves to cover all alternatives, modifications and equivalents of the different features and example embodiments. Many other examples will be immediately and directly clear to the person skilled in the art on account of his technical knowledge when considering the above description.

The example embodiments have been selected and described in order to be able to illustrate the principles underlying the invention and their potential applications in practice as effectively as possible. As a result, persons skilled in the art will be able to modify and use the invention and its various example embodiments in an optimum manner with regard to the intended purpose.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An imaging apparatus for creating an image of an object, comprising:
   an X-ray radiation source configured to emit X-ray radiation toward the object in a receiving region;
   a converter configured to perform spatially resolved conversion of the X-ray radiation into visible light after the X-ray radiation passes through the receiving region;

a pattern generator configured to generate a plurality of light and shadow patterns (LSPs) by at least one of overriding the visible light or partially shadowing the visible light, the plurality of LSPs being generated at different times;

a detector configured to emit a plurality of detector signals based on the plurality of LSPs, the pattern generator being between the converter and the detector; and at least one processor configured to cause the imaging apparatus to generate the image of the object based on the plurality of detector signals and information corresponding to the plurality of LSPs.

2. The imaging apparatus of claim 1, wherein the detector has a resolution of:
greater than or equal to five detector pixels; and
less than or equal to one hundred detector pixels.

3. The imaging apparatus of claim 2, wherein several of the detector pixels are grouped together to form a read-out unit.

4. The imaging apparatus of claim 1, wherein the detector is a single-detector-pixel detector.

5. The imaging apparatus of claim 1, wherein a resolution of the plurality of LSPs is greater than a resolution of the detector.

6. The imaging apparatus of claim 1, wherein the detector is configured to perform a time integration or summation of the plurality of detector signals.

7. The imaging apparatus of claim 1, wherein the plurality of LSPs are linearly independent.

8. The imaging apparatus of claim 1, wherein the pattern generator is configured to continuously generate a different LSP among the plurality of LSPs.

9. The imaging apparatus of claim 2, wherein the detector is a single-detector-pixel detector.

10. The imaging apparatus of claim 2, wherein a resolution of the plurality of LSPs is greater than a resolution of the detector.

11. The imaging apparatus of claim 2, wherein the detector is configured to perform a time integration or summation of the plurality of detector signals.

12. An imaging method for creating an image of an object, comprising:
emitting X-ray radiation from an X-ray radiation source toward the object in a receiving region;
performing a spatially resolved conversion of the X-ray radiation into visible light after the X-ray radiation passes through the receiving region;
generating a plurality of light and shadow patterns (LSPs) by at least one of partially shadowing the visible light or overriding the visible light, the plurality of LSPs being generated at different times;
generating a plurality of detector signals based on the plurality of LSPs as registered by a detector; and
generating the image of the object based on the plurality of detector signals and information corresponding to the plurality of LSPs.

13. The imaging method of claim 12, wherein the detector has a resolution of:
greater than or equal to five detector pixels; and
less than or equal to one hundred detector pixels.

14. The imaging method of claim 12, wherein the detector includes several detector pixels that are grouped together to form a read-out unit.

15. The imaging method of claim 12, wherein the detector is a single-detector-pixel detector.

16. The imaging method of claim 12, wherein a resolution of the plurality of LSPs is greater than a resolution of the detector.

17. The imaging method of claim 12, further comprising:
performing a time integration or summation of the plurality of detector signals.

18. A non-transitory computer readable medium storing program code that, when executed by at least one processor, is configured to cause an imaging apparatus to perform the method of claim 12.

* * * * *